United States Patent
Bartel et al.

[19]

[11] Patent Number: 6,006,143
[45] Date of Patent: Dec. 21, 1999

[54] METHOD OF OPERATING A CONTROL SYSTEM FOR THE CONTROL OF MOTOR VEHICLE COMPONENTS

[75] Inventors: Peter Bartel, Hattingen; Wilfried Ostermann, Essen; Fred Welskopf, Herne, all of Germany

[73] Assignee: Kiekert AG, Heiligenhaus, Germany

[21] Appl. No.: 08/653,771

[22] Filed: May 24, 1996

[30] Foreign Application Priority Data

Aug. 18, 1995 [DE] Germany .............. 195 30 727

[51] Int. Cl.⁶ .................. G06F 7/70; G06G 7/70
[52] U.S. Cl. .................... 701/1; 701/36; 701/49
[58] Field of Search .................... 701/1, 33, 36, 701/49; 307/10.1; 318/966

[56] References Cited

U.S. PATENT DOCUMENTS

| | | | |
|---|---|---|---|
| 4,477,874 | 10/1984 | Ikuta et al. ........................ | 701/49 |
| 5,019,759 | 5/1991 | Takemura et al. ................. | 701/49 |
| 5,081,586 | 1/1992 | Barthel et al. .................... | 701/49 |
| 5,481,456 | 1/1996 | Ogura ............................... | 701/1 |
| 5,488,733 | 1/1996 | Molyneaux ....................... | 701/1 |

FOREIGN PATENT DOCUMENTS 0 470 056 A2  7/1991  European Pat. Off. .

*Primary Examiner*—V. Lissi Mojica
*Attorney, Agent, or Firm*—Herbert Dubno

[57] ABSTRACT

A method of operating a control system for controlling the electrically-operated components of a motor vehicle in which a central processor and satellite processors for the components are connected with a multiplex single-conductor bus and master signals and control signals are transmitted bidirectionally between the processors along the bus. The central processor and the satellite processors can both operate as masters with respective characteristic addresses and the satellite or central processor upon receipt of a master signal and/or control signal can issue master or control signals with a priority determined by the bus access times of the respective signals.

10 Claims, 6 Drawing Sheets

METHOD OF OPERATING A CONTROL SYSTEM FOR THE CONTROL OF MOTOR VEHICLE COMPONENTS

FIELD OF THE INVENTION

Our present invention relates to a method of operating a control system for controlling electrically-operated motor vehicle components such as motor vehicle door locks, trunk closures, hood locks, glove compartment closures, fuel tank closures, window lifters, external mirrors, antitheft alarm and warning systems and the like. More particularly, the invention relates to a method of operating a control system of the type in which a central processor is connected to satellite processors associated with the respective electrically-operated motor vehicle components and wherein the connection is made by a multiplex single-conductor bus system over which digital master signals and control signals are transmitted bidirectionally in a dialogue between the satellite processors and the central processor.

BACKGROUND OF THE INVENTION

Both for comfort and security, motor vehicles are increasingly provided with central processor control systems for the electrically-operated components, including, especially, the antitheft warning system and the various components also mentioned above.

For example, with a computerized system the electrical components can be set to accommodate various drivers of the vehicle to permit the components such as the seat setting and mirror setting to be established for each individual likely to drive the vehicle. Other components which can be controlled through the central processor, can include interior lighting, trunk lighting, heatable rear windows and the like.

Prior to the advent of central processor controls, i.e. in classical electrotechnical wiring of motor vehicle harnesses, each of the vehicle components, including the respective actuating elements such as switches, push buttons or the like, were wired separately.

The number of components and control elements, wires and the like was, therefore, substantial and the cost of the wiring system was very high. In addition, reliability of the electrical system fell with increasing complexity and the cost of repair and maintenance was high as well.

Utilizing a central processor and a control system in which the central processor could operate a multiplicity of the vehicle components through a bus arrangement, a service person was able to maintain the system more simply and the system allowed actuation and initiation of the various functions through the central processor. In this case, the actuation of the various components is effected in a manner similar to the manipulation of a keyboard of a computer.

The use of satellite processors, however, permits local electrical actuators to be used as well and is especially advantageous in the case of window lifters and the like. When satellite processors are used, they are generally provided close to or in the vehicle components which they are intended to control. The satellite processor can be provided to operate only a single vehicle component or a number of vehicle components. Furthermore, each satellite processor can be designed to enable a single function to be carried out or to allow one or more vehicle components to have various functions carried out therein. In the case of a vehicle door lock, for example, the locking, unlocking, antitheft securing, disconnection of the antitheft mode, opening of the latch and even the function of drawing the door tight, may be automatically performed by, for example, electric motors connected to the door lock system under the control of the satellite processor.

With complex control functions of this type, especially in the case of vehicle door locks, the vehicle components, for example, the levers and links of the door lock system, can be provided additionally with sensors, especially Hall-effect position sensors, whereby the actual positions of the elements of the components can be determined and which can be connected to the respective satellite processor.

A multiplex single-conductor bus, as mentioned previously, is a system for the serial transmission of digital information which requires only a single conductor connecting the central processor with satellite processors, usually via respective branches, utilizing digital signals which, as a rule operate as pulse-width-modulation. It is possible utilizing a multiplex single-conductor bus to eliminate the need for a separate so-called clock line, the counterpole for the conductor of the multiplex single-conductor bus is the vehicle ground or chassis ground. Of course it can also be a ground line, for example, a shield for the bus conductor.

Apart from the multiplex single-conductor bus, only a current supply line need be connected to the motor-vehicle component.

Mention above of a master signal is intended to designate a signal delivering digital information which effects an activation or deactivation of a motor vehicle component. A control signal, then, is a signal which provides digital information as to the status of a motor-vehicle component or is an error-control signal for feeding back of the occurrence of an incomplete action or operation or a failure in the activation or deactivation. To the extent that such signals are transmitted in both directions between satellite processors and the central processor, the multiplex single-conductor bus is considered to provide a bidirectional dialogue between the processors.

A method of the aforedescribed type is found in EP-O 470 056 A2. In that system, the central processor is operated as the "master" while the satellite processors operate as "slaves." The "master" issues master signals or control signals which are transmitted over the multiplex single-conductor bus. A "slave" can only issue master signals or control signals which are transmitted over the multiplex single-conductor bus when it is interrogated by the master and thus is "enabled" by the master to issue such signals.

The earlier process operates address-free, i.e. master signals or control signals are not especially directed to the central processor or to one of the satellite processors. On the contrary, each satellite processor has an interface circuit through which the single-conductor bus is connected to that satellite processor. A first interface circuit permits master signals or controls signals to reach a second subordinate interface circuit only after the satellite processor associated with the first interface circuit has carried out certain routines. The processing continues with this hierarchical operation. Thus the satellite processors are not parallel to one another as same-rank units which are connected to the multiplex single-conductor bus.

The earlier process is thus comparatively slow and, when attempts are made to operate it by utilizing higher operating frequencies, the system tends to become unreliable. Significant time may be necessary in such systems before a lower ranked satellite processor, comparatively distal to the central processor, may be used for activation of the respective vehicle component.

OBJECTS OF THE INVENTION

It is therefore the principal object of the present invention to provide an improved method of operating a multiplicity of electrically-operated components of a motor vehicle whereby the aforedescribed drawbacks are avoided.

More specifically, it is an object of the invention to provide a method of operating a control system for controlling electrically-driven motor-vehicle components which is simple and reliable.

Another object of the invention is to provide for the parallel operation of a multiplicity of electrical components of a motor vehicle through respective satellite processors without the need for processor ranking or a hierarchical relationship or satellite processors which could delay the operation of a low-ranked electrically-operated component of the motor vehicle.

SUMMARY OF THE INVENTION

These objects and others which will become apparent hereinafter are attained, in accordance with the invention, in a method of operating a control system for controlling electrically-driven motor-vehicle components such as, for example, the motor-vehicle door locks, the trunk closure, the hood closure, the glove compartment closure, the fuel tank closure, window lifters, external mirrors, antitheft warning systems and the like and in which the control system comprises a central processor and respective satellite processors assigned to the respective motor-vehicle components.

The satellite processors are connected with the central processor via a multiplex single-conductor bus whereby digital pulse-width-modulator master signals and control signals are transmitted bidirectionally over the multiplex single-conductor bus between the central processor and the satellite processors back and forth.

The central processor or the satellite processors can act as a master with respective characteristic addresses whereby, from the central processor or one of the satellite processors after a transmission of a master signal and/or a control signal, a master signal and/or control signal with a priority determined by its bus access time is forwarded over the bus. The signal with the shortest bus access time and highest priority is an error-control signal and the master and/or control signals with longer access times in steps are signals with decreasing priorities.

The invention is based upon the fact that both in the operation of the central processor and the operation of the satellite processors as masters, the processors are equal ranked and truly parallel as to their connection to the multiplex single-conductor bus. As a consequence, a direct and therefore less extensive dialogue is required between the central processor and one or more of the satellite processors.

The central processor and the satellite processors, however, must be associated with characteristic addresses whereby a specific address code different from other individual address codes must be provided for each processor. Of course, address codes can also be provided for processor groups which may have to be operated simultaneously. For example, an address code for the group of satellite processors associated with all of the side doors of the vehicle can be provided for simultaneous unlocking of all of these doors when desired.

The invention is also based upon the fact that all of the processors can operate as masters so that the function of the control system can be matched to the vehicle and the bus more readily. This can be achieved by programming the processors so that they have fixed priorities for certain types or groups of master and/or control signals and the priorities are controlled via the bus access times.

The "bus access time" is the time period between the end of a transmission and the beginning of the next transmission along the bus. A master signal or control signal has higher priority and in the case of an error-control signal, the highest priority if it can be applied to the multiplex single-conductor bus before another processor can issue a master or control signal of lower priority thereto. The other processor must then wait until the dialogue with higher priority is completed and then only will issue its master or control signal to the multiplex single-conductor bus. By a stepping of the priorities, the motor-vehicle components can be operated in ranked relationship without the delay described in connection with the prior art. For example, the locking or unlocking function can have a higher priority than a mirror-adjustment function.

In a preferred embodiment of the invention, each master signal and each control signal has a starting pulse and eight bit pulses to form a byte. The eight bit pulses can be constituted by three address pulses and five information pulses.

Especially high reliability is achieved with each master signal and/or each control signal is transmitted thrice as a triplet with identical triplet elements, a pause between the triplet elements having a duration shorter than the bus access time for the transmission of the error-control signal. The triplet elements are compared with one another and a central processor or satellite processor receiving the triplet and upon a failure in agreement of at least two triplet elements in the receiving central processor or satellite processor, the error-control signals may be transmitted. In other words the receiving processor can be activated upon receipt of two triplet elements which match one another. Thus a perturbation in only one of the triplet elements because of electromagnetic scattering, noise or the like will have no effect on the operation.

Advantageously, the satellite pulse duration is used to synchronize the central processor and the satellite processors with one another. To compensate for different operating frequencies of the satellite processors and/or the central processor, the starting flank of each pulse can establish a time window. Especially high reliability can be achieved even in the case of fluctuating operating voltages of the vehicle when the multiplex signal conductor bus is held in its inactive state at its high level and a threshold to the low level is dynamically matched to a measurement of the actual voltage of the high level. Under these operating conditions, the control system operates reliably even when the charge on the vehicle battery is low. More particularly, the method of the invention controls a multiplicity of electrically controllable motor-vehicle components selected from motor-vehicle door locks, a trunk lock, a hood lock, a glove compartment lock, a fuel-tank lock, a window lifter, an external mirror, and an antitheft warning unit. The method comprises the steps of:

(a) connecting a central processor of the control system and at least one respective satellite processor for each of the electrically controllable motor-vehicle components with a multiplex single-conductor bus;

(b) transmitting digital pulse-width-modulated master signals constituting a first class of signals and pulse-width-modulated control signals constituting a second class of signals bidirectionally over the bus between the central processor and the satellite processors;

(c) operating both the central processor and the satellite processors selectively as master with respective characteristic addresses with the signals transmitted bidirectionally over the bus; and (d) upon receipt of one of the signals by one of the processors generating at the one of the processors a master or control signal with a selected priority value set by assignment of a respective bus access time thereto and sending over the bus an error-control signal corresponding to the signal with the shortest bus access time and the highest priority, and sending over the bus master or control signals with stepwise longer bus access times and lesser priorities.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
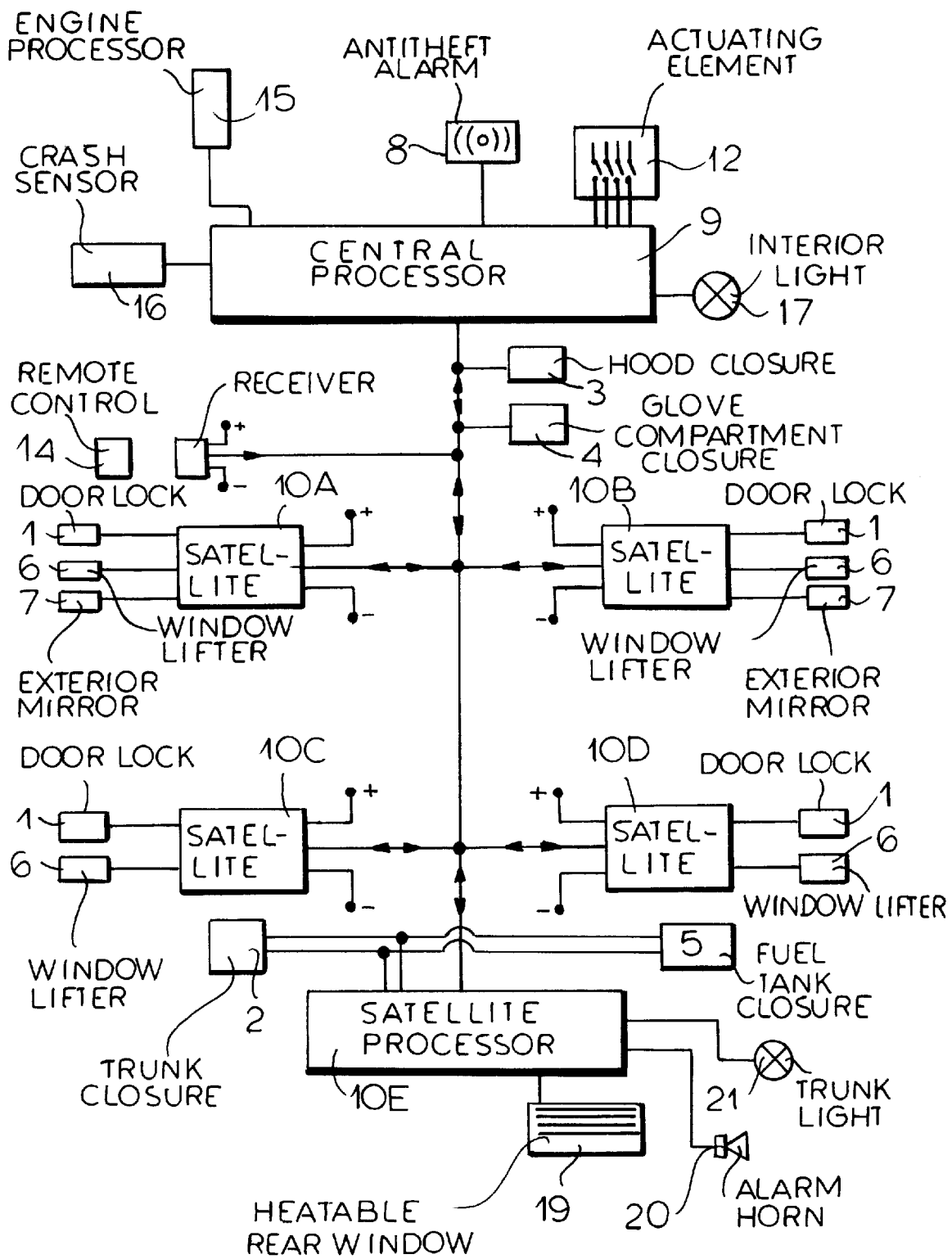
FIG. 1 is a schematic block diagram of a control system of the invention.

The control system shown in FIG. 1 comprises a central processor 9 and a multiplicity of electrically-operated motor vehicle components each of which is provided with a satellite processor 10A–10E, and the central processor 9 being connected together by a multiplex single-conductor bus 11. In the embodiment illustrated, the electrically-operated motor-vehicle components include vehicle door locks 1, a trunk closure 2, the hood closure 3, the glove compartment closure 4, the fuel-tank closure 5, the various window lifters 6 and exterior mirrors 7 for the two front doors of the vehicle. The antitheft warning unit 8 is connected to the central processor 9 whereas the interior lighting 17 can be connected to the central processor 9 while the heatable rear window 19 is activated through a satellite processor 10E as is the alarm horn 20 and the trunk light 21.

The central processor 9 has connected therewith a plurality of electric actuating elements 12 which have been represented as switches and which can be push-button operated or otherwise actuated.

In addition, the central processor 15 may have a crash sensor 16 which can be used to automatically unlock the vehicle doors in the case of a collision or crash. Furthermore, the central processor 9 can be connected with the engine control processor 15 which controls the various functions of the internal combustion engine.

A remote control receiver 13 can cooperate with a remote control transmitter 14 which can send a modulated and, advantageously coded signal by a wireless source, either in the form of light waves (IR) or radial waves (HF) to the receiver so that operating signals can be generated thereby and supplied to the bus 11.

Via the multiplex single-conductor bus 11, digital pulse-width-modulated master signals S and control signals K are composed bidirectionally between the central processor 9 and the satellite processors 10 and the remote control receiver 13. This bidirectional transmission has been represented in FIG. 1 by arrows along the bus 11.

The central processor 9 as well as the satellite processors 10 can serve as masters with respective characteristic addresses. The central processor 9 and the satellite processors 10 are connected to the bus in parallel with one another and thus have equal rank. The same applies for the remote control receiver 13.

Figure 2:
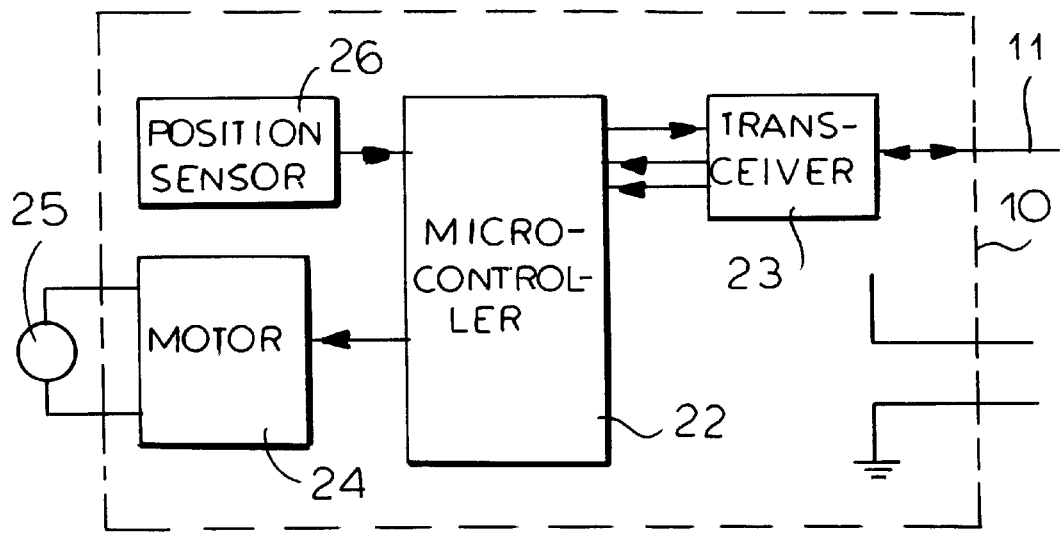
FIG. 2 is a block diagram of the satellite processor.

From FIG. 2 it will be apparent that each satellite processor 10 has a respective microcontroller 22 and a transceiver 23. If the satellite processor 19 is built into or forms part of a door lock, it can include a motor 24 forming a driver or effector controlled by the satellite processor and activating the electrically-controlled unit which is here represented at 25. Position sensors 26 can be provided to respond to the position of the driving unit 25 and provide a feedback signal to the microcontroller 22. Through the use of a motor as the driver or effector, instead of a relay and the use of Hall sensors as position sensors for the microcontroller, the functional reliability of the control system is significantly increased.

Figure 3:
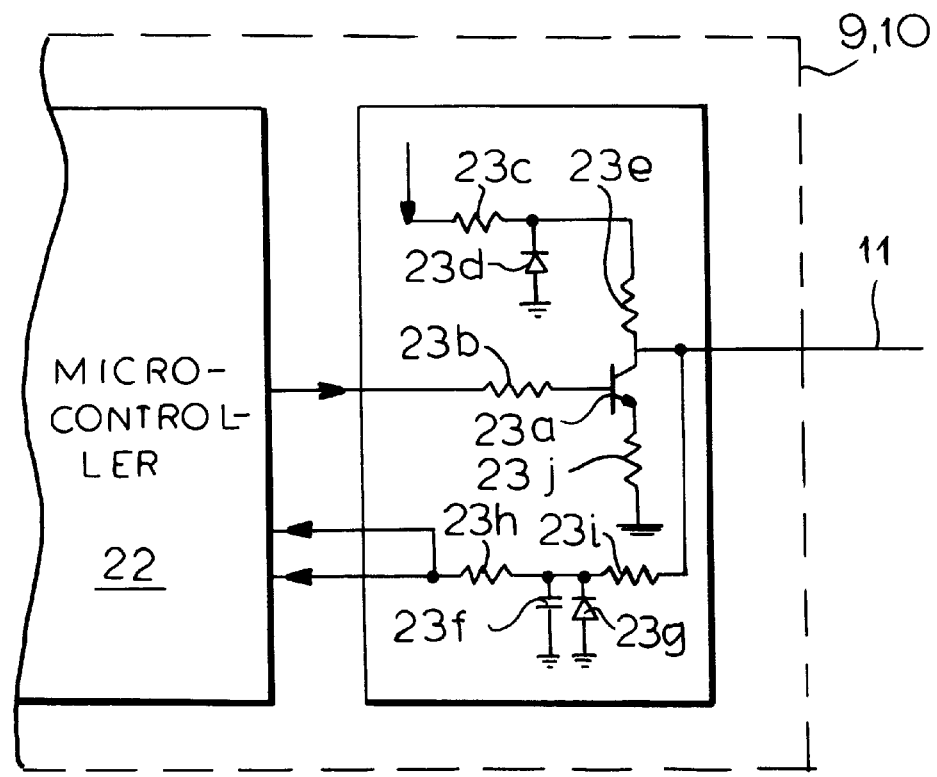
FIG. 3 is a circuit diagram showing the connection of a satellite processor to the multiplex single-conductor bus.

FIG. 3 shows a discrete circuit by means of which the microcontroller 22 is interfaced with the bus. In this case the circuit includes a transistor 23a of the transceiver 23 whose base is connected via a resistor 23b of an output of the microcontroller 22, the bus 11 being connected to the emitter/collector network of the transistor 23a which has a resister 23c connected at one side of a diode 23c and another resistor 23e connected at the opposite side of the diode 23d.

The capacitor 23f is bridged across a diode 23g in a circuit providing resistors 23h and a and returning the bus 11 to the microcontroller 22. A resister 23j connected between the emitter and ground provides the emitter bias.

Figure 4A:
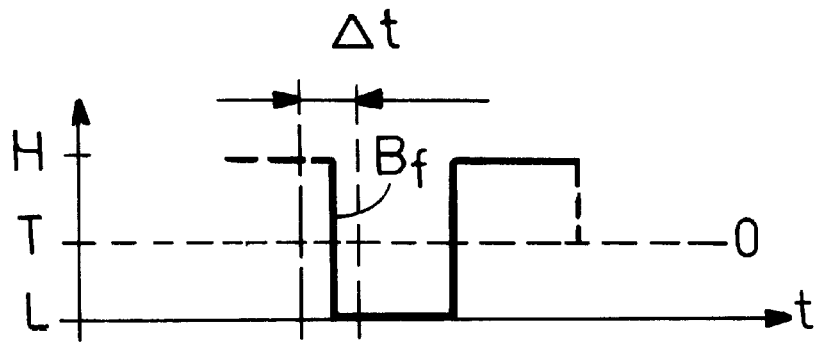
FIG. 4a and 4b are wave form diagrams of bits for different logic states and pulse-width-modulation.
Figure 4B:
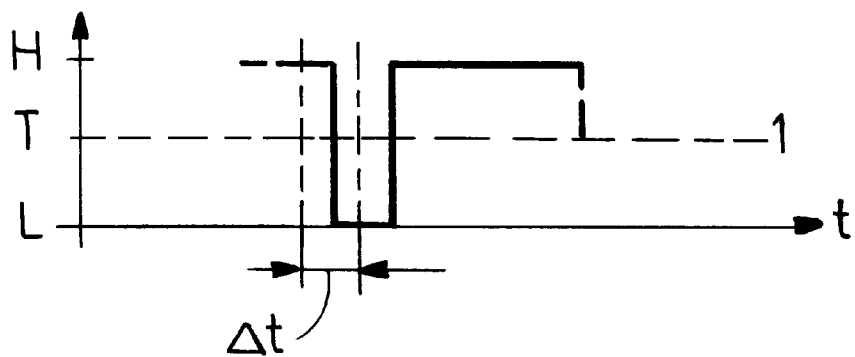

FIG. 4a and 4b show the transmission of bits utilizing pulse-width-modulation. From these Figures it will be apparent that initially the multiplex single-conductor bus 11 in its active state is held at a high level H. Each bit then begins with a steeply falling flank $B_f$ which establishes a window $\Delta_t$. From comparison of FIGS. 4a and 4b one can see that a bit has the logic state "0" when the keying ratio amounts to about 50% (FIG. 4a) and the logic state "1" when the keying ratio only amounts to 25% (FIG. 4b). FIGS. 4a and 4b also illustrate the time window $\Delta_t$ for the starting flank $B_f$ for each bit which allows the compensation of different operating frequencies of the satellite processors 10A–10E and/or the central processor 9.

Even with a slight difference in operating frequencies of the processors, a reliable differentiation can thus be provided between the logic states "0" and "1".

Figure 5:
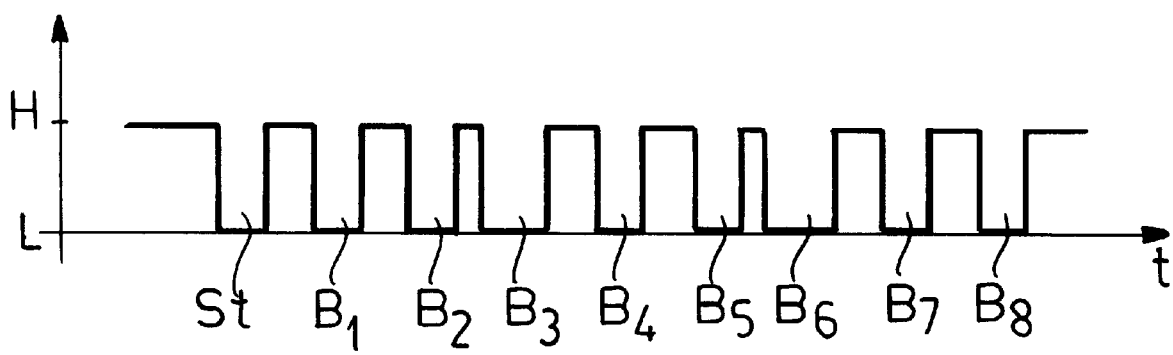
FIG. 5 is a wave form diagram of one byte of a master signal and/or control signal according to the invention.

From FIG. 5 it can be seen further that each master signal S and each control signal K has a starting pulse St and eight bit pulses $B_1 \ldots B_8$ to form a byte. In particular, three bits $B_1, B_2, B_3$ can form address pulses while the remaining five bits constitute five information pulses.

Figure 6A:
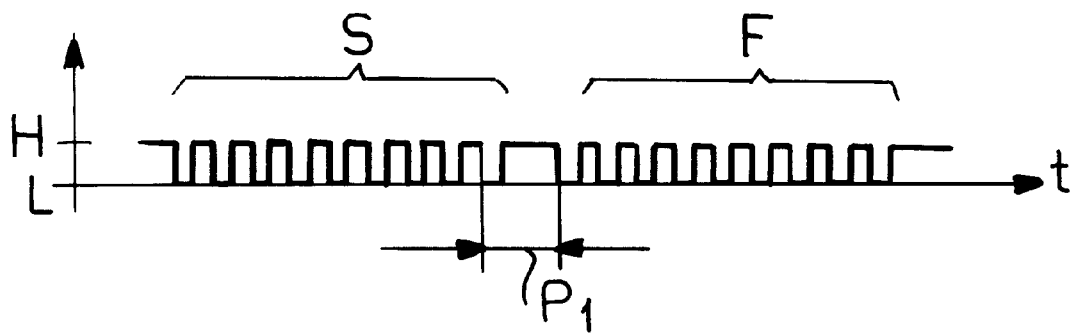
FIG. 6a–6c are pulse diagrams for a bus dialogue with master signals or control signals of different priorities.
Figure 6B:
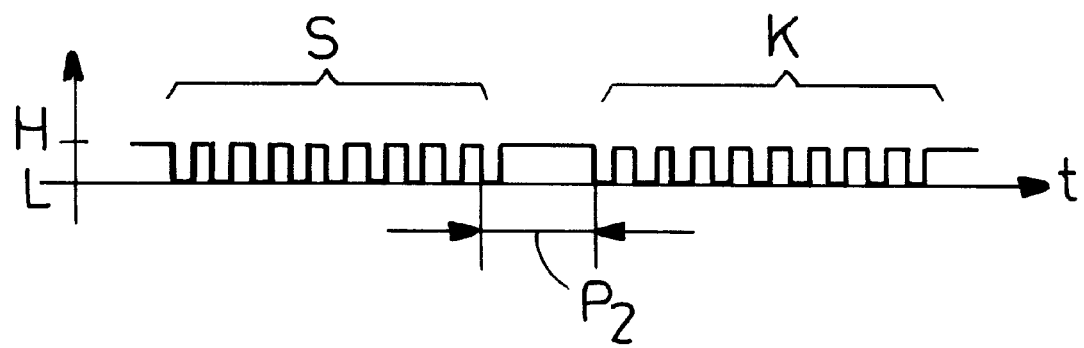
Figure 6C:
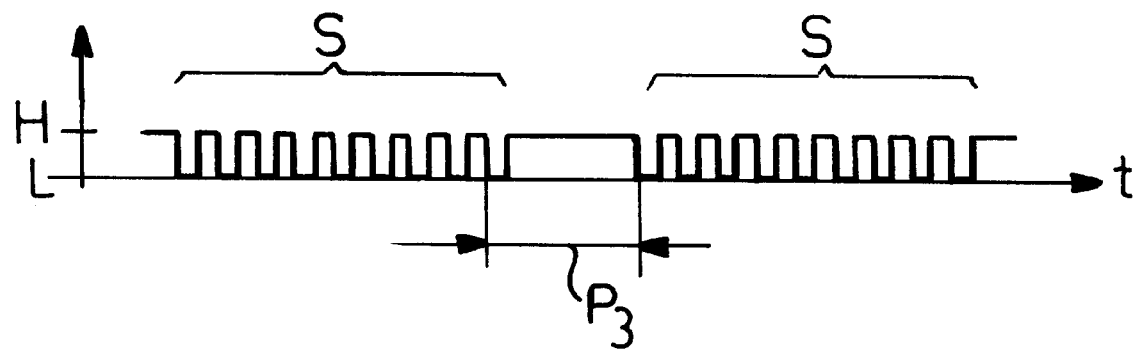

FIG. 6a–6c schematically show that a central processor 9 or one of the satellite processors 10A–10E, upon receiving a master signal S and/or a control signal K with bus access times $P_1, P_2, P_3$ determining the respective priorities under the principles indicated above, will process the signals in accordance with the bus access time and specifically will process the signal with the shortest bus access time with the highest priority. The signal carrying the shortest access time $P_1$ and the highest priority causes the transmission of an error-control signal F (FIG. 6a) onto the bus. With stepwise longer bus access times $P_2$, $P_3$, the master and/or control signals S, K of decreasing priorities send control or master signals K and S as represented in FIGS. 6b and 6c.

Figure 7:
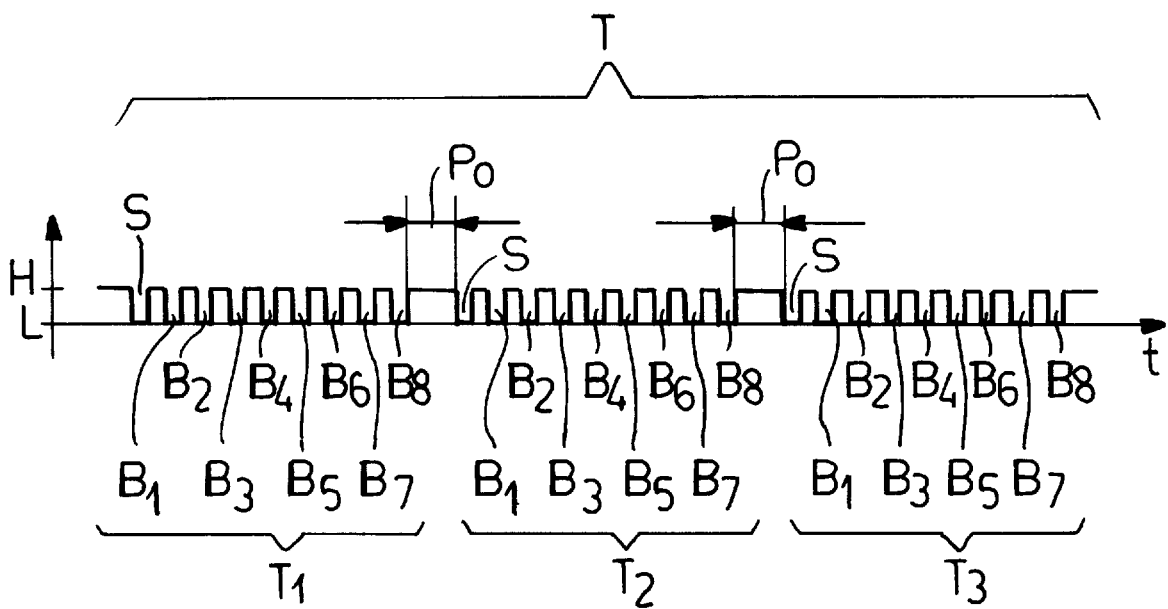
FIG. 7 is a pulse diagram of a master or control signal formed as a triplet.

From FIG. 7 it can be seen that each master signal S and/or each control signal K is a three-fold signal or triplet T with three identical triplet elements $T_1$, $T_2$, $T_3$ and pauses $P_0$ between the triplet elements $T_1$, $T_2$, $T_3$. The duration of each pause $P_0$ is shorter than the bus access time $P_1$ for the transmission of an error-control signal F. As the triplet elements $T_1$, $T_2$, $T_3$ of each triplet is received by the central processor 9 or a satellite processor 10A–10E, the triplet elements $T_1$, $T_2$, $T_3$ are compared with one another and upon agreement of at least two, an error control signal F is transmitted.

Figure 8:
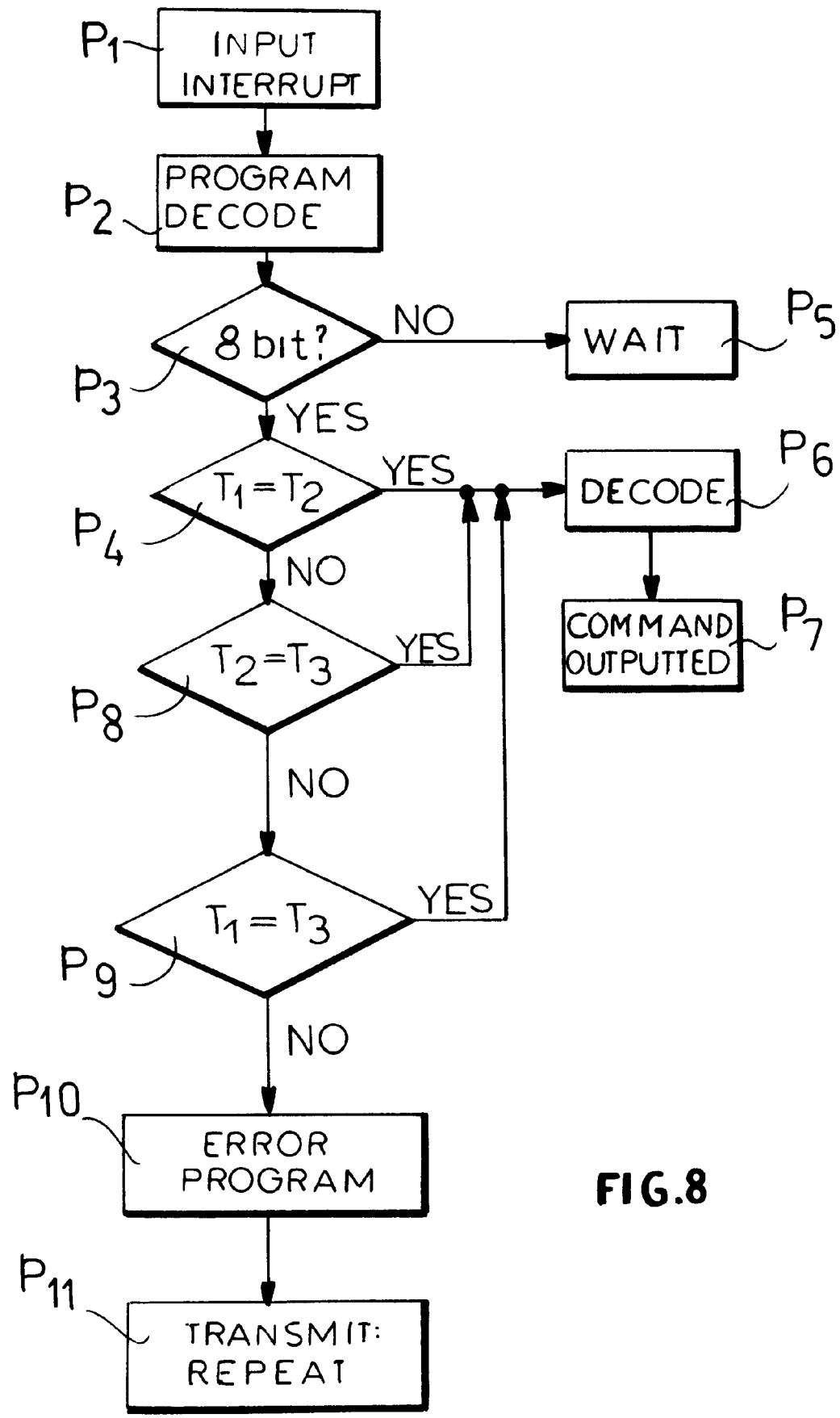
FIG. 8 is an information flow diagram for the evaluation of a master signal or control signal formed as a triplet.

The comparison of the elements of the triplet can be effected by the program represented by the information flow diagram shown in FIG. 8.

More particularly, an input at the interrupt $P_1$ initiates the decoding step $P_2$. If eight bits are detected at $P_3$, a first comparison between two elements $T_1$ and $T_2$ is effected at $P_4$. If eight bits are not detected, the program is put on hold at $P_5$. If there is a match at $P_4$ decoding is carried out at $P_6$ and a command is issued at $P_7$.

If there is no match at $P_4$, elements $T_2$ and $T_3$ are compared at $P_8$ and again, if there is no match, elements $T_1$ and $T_3$ are compared at $P_9$. Where a match exists, decoding is effected at $P_6$.

If there is no match among the elements of the triplet, the error program is initiated at $P_{10}$ and a "repeat" T is sent at $P_{11}$.

Figure 9:
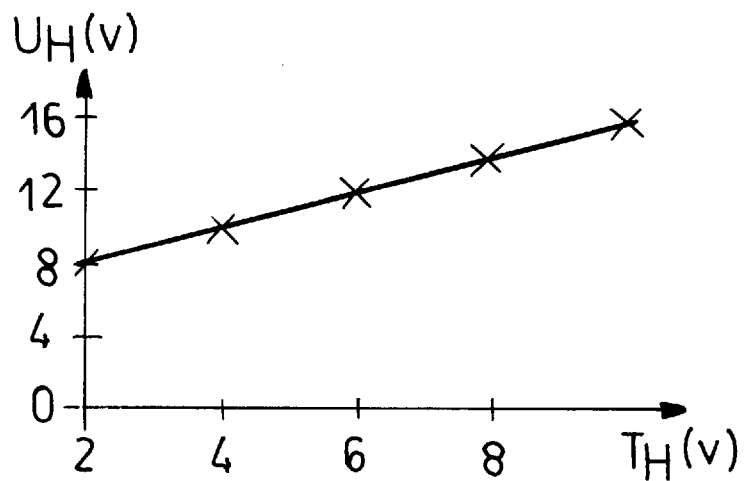
FIG. 9 is a graph of the dynamic shift of the switching threshold between high level and low level.

From FIG. 9 it will be apparent that a threshold TH in the form of a voltage can be varied for differentiating between the higher level H and the low level L dynamically as a function of the actual supply voltage $U_H$ of the vehicle battery.

The control system can also include connection to the bus 11 or the central processor 9 for plugging in a diagnostic unit of the type available in service stations for diagnosing engine status. The diagnostic device can be used to set the addresses of the various vehicle components and processors or to check upon the addresses utilizing such a diagnostic device, it is possible to determine without difficulty when a satellite processor, for example, is continuously transmitting an error-control signal F with its sender address. Thus a defect in that satellite processor is readily detected. Because of its simple construction and operation, the system of the invention is especially service-friendly. The control system as shown in FIG. 1 can operate reliably at a data rate of 1000 bits per second without a noticeable delay in reaction for the user.

We claim:

1. A method of operating a control system for a multiplicity of electrically controllable motor-vehicle components selected from motor-vehicle door locks, a trunk lock, a hood lock, a glove compartment lock, a fuel-tank lock, a window lifter, an external mirror, and an antitheft warning unit, said method comprising the steps of:

(a) connecting a central processor of said control system and at least one respective satellite processor for each of said electrically controllable motor-vehicle components all in parallel with a multiplex single-conductor bus;

(b) transmitting digital pulse-width-modulated master signals constituting a first class of signals and pulse-width-modulated control signals constituting a second class of signals bidirectionally over said bus between said central processor and said satellite processors;

(c) operating both said central processor and said satellite processors selectively as master with respective characteristic addresses with the signals transmitted bidirectionally over said bus; and (d) upon receipt of one of said signals by one of said processors generating at said one of said processors a master or control signal with a selected priority value set by assignment of a respective bus access time thereto and sending over said bus an error-control signal corresponding to the signal with the shortest bus access time and the highest priority, and sending over said bus master or control signals with stepwise longer bus access times and lesser priorities.

2. The method defined in claim 1 wherein each of said master signals and each of said control signals comprises a byte consisting of a starting pulse and eight bit pulses, the eight bit pulses including three address pulses and five information pulses.

3. A method of operating a control system for a multiplicity of electrically controllable motor-vehicle components selected from motor-vehicle door locks, a trunk lock, a hood lock, a glove compartment lock, a fuel-tank lock, a window lifter, an external mirror, and an antitheft warning unit, said method comprising the steps of:

(a) connecting a central processor of said control system and at least one respective satellite processor for each of said electrically controllable motor-vehicle components with a multiplex single-conductor bus;

(b) transmitting digital pulse-width-modulated master signals constituting a first class of signals and pulse-width-modulated control signals constituting a second class of signals bidirectionally over said bus between said central processor and said satellite processors;

(c) operating both said central processor and said satellite processors selectively as master with respective characteristic addresses with the signals transmitted bidirectionally over said bus; and (d) upon receipt of one of said signals by one of said processors generating at said one of said processors a master or control signal with a selected priority value set by assignment of a respective bus access time thereto and sending over said bus an error-control signal corresponding to the signal with the shortest bus access time and the highest priority, and sending over said bus master or control signals with stepwise lonaer bus access times and lesser priorities wherein each of the signals of at least one of said classes being transmitted thrice over said bus as a triplet with identical triplet elements and pauses between elements of each triplet, said pauses being shorter in duration than said bus access time for said error-control signals, the method further comprising comparing the elements of the triplet with one another in succession in said one of said processors, and sending said error-control signal upon failure of agreements of successive elements of the triplet upon comparison.

4. The method defined in claim 2, further comprising the step of synchronizing said central processor and said satellite processors with the duration of said starting pulse.

5. The method defined in claim 2 wherein for the leading flank of each pulse a time window is established for compensation of different operating frequencies of said satellite processor or said central processor.

6. The method defined in claim 1 wherein said multiplex single-conductor bus is held at a high level in an inactive state thereof and whereby a switching threshold to a low level is matched to the high level dynamically after a supply of the actual voltage of the high level.

7. The method defined in claim 3 wherein each of said master signals and each of said control signals comprises a byte consisting of a starting pulse and eight bit pulses, the eight bit pulses including three address pulses and five information pulses.

8. The method defined in claim 7, further comprising the step of synchronizing said central processor and said satellite processors with the duration of said starting pulse.

9. The method defined in claim 7 wherein for the leading flank of each pulse a time window is established for compensation of different operating frequencies of said satellite processor or said central processor.

10. The method defined in claim 3 wherein said multiplex single-conductor bus is held at a high level in an inactive state thereof and whereby a switching threshold to a low level is matched to the high level dynamically after a supply of the actual voltage of the high level.

* * * * *